Sept. 27, 1938.  C. E. GRAY ET AL  2,131,511
CONTINUOUS METHOD OF MANUFACTURING FROZEN FOOD PRODUCTS
Filed June 27, 1928  2 Sheets-Sheet 1
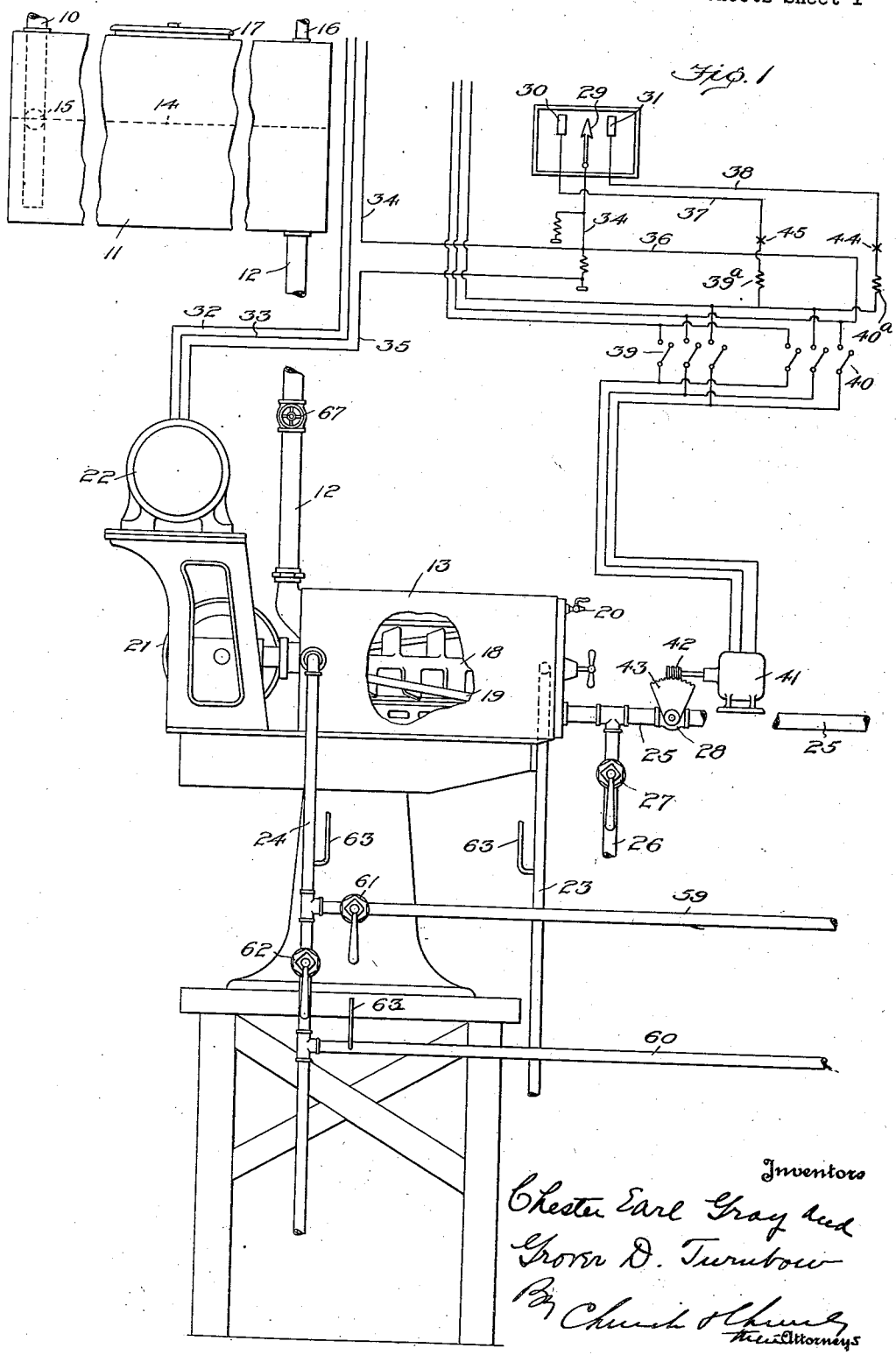

Sept. 27, 1938. C. E. GRAY ET AL 2,131,511
CONTINUOUS METHOD OF MANUFACTURING FROZEN FOOD PRODUCTS
Filed June 27, 1928 2 Sheets-Sheet 2
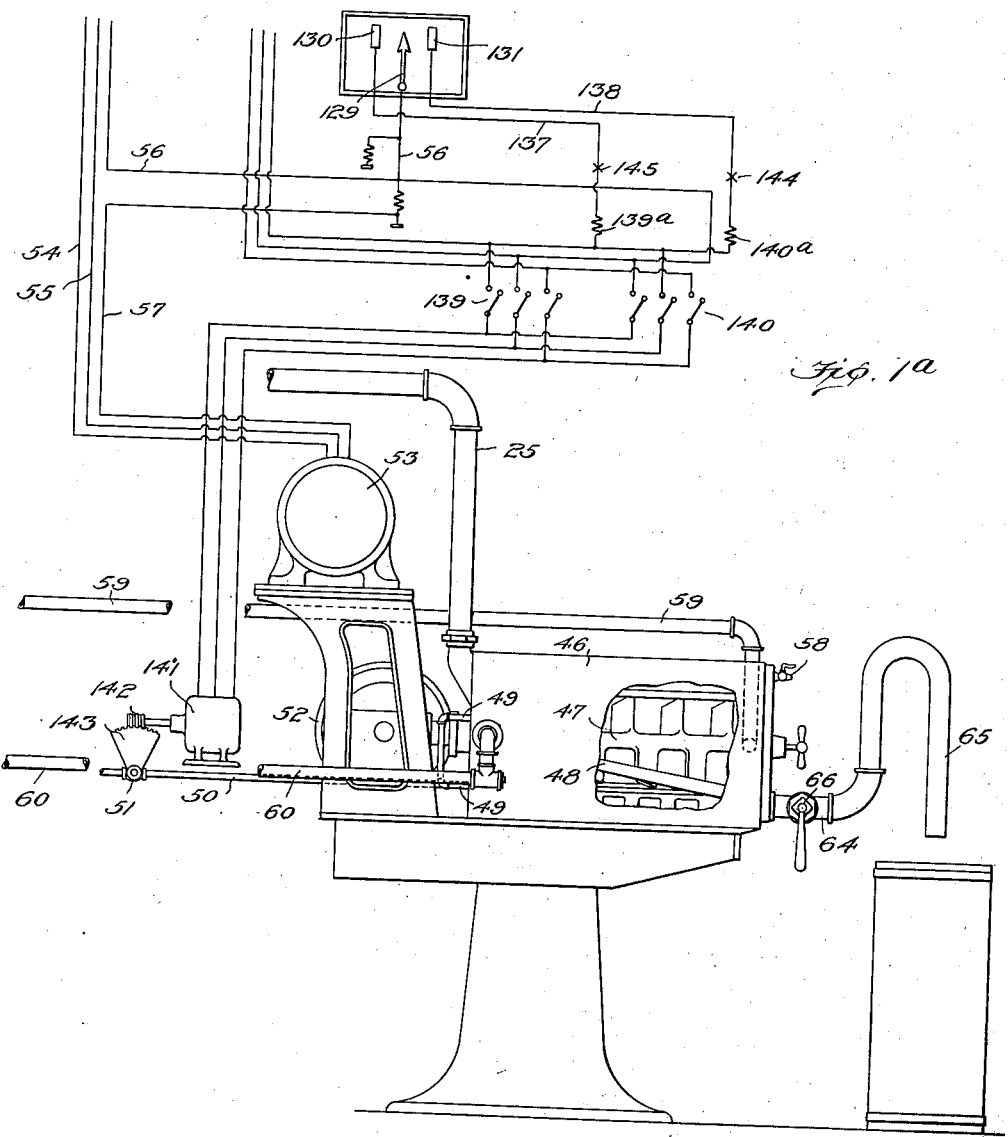
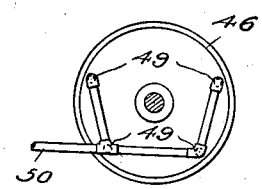

Patented Sept. 27, 1938

2,131,511

UNITED STATES PATENT OFFICE 2,131,511

CONTINUOUS METHOD OF MANUFACTURING FROZEN FOOD PRODUCTS

Chester Earl Gray and Grover D. Turnbow, Oakland, Calif.

Application June 27, 1928, Serial No. 288,788

13 Claims. (Cl. 62—174)

The present invention relates to an improved method or process of manufacturing frozen food products such as ice cream, ices, sherberts, and the like, which are produced from liquids or semi-liquids and of which a substantial quantity of air or other gases is a normal constituent.

In the past, numerous attempts have been made to devise methods and apparatus for continuously freezing such products, but, due to the difficulty or inability to successfully regulate the air or gaseous content of the finished product, these prior efforts are believed to have constantly proven unsuccessful. As a result, the general methods and apparatus now utilized commercially for the production of the products mentioned have been confined to the intermittent or batch type. In these intermittent or batch methods, however, the freezing and whipping operations are always carried out in the presence of an excessive volume of air, and, as a consequence, considerable skill and care must be exercised at all times to incorporate the desired percentage of air or gas in the frozen product, and to obtain the desired percentage in said product after it is finally finished, and while it is being discharged from the freezing and whipping apparatus. To overcome these various difficulties, the present invention contemplates a method and apparatus wherein a regulated quantity or volume of air or gas is supplied to the mixture so that the desired percentage incorporated in the finished product will remain constant in the entire output of the apparatus.

A further object of the invention is to provide a continuous freezing and whipping of the mixture instead of operating on such mixture intermittently, so that there is a continuous discharge of the finished product from the apparatus, the air or gas content of said product remaining constantly at a predetermined percentage, due to the fact that the apparatus is provided with the means for supplying a regulated quantity of air or gas to the mixture while it is being operated upon. This is quite advantageous, because it results in the production of a product possessing uniform characteristics and by reason of the continuous method of operation contemplated, there is a substantial reduction in the manufacturing cost of the frozen product, and it is possible to obtain the desired uniform composition in the product with less care and skill than has heretofore been required in those methods or apparatus operating on an intermittent basis.

One type of apparatus is illustrated in the accompanying drawings, wherein

Figures 1, 1ª jointly constitute a more or less diagrammatical layout; and

Figure 2 is a detailed end view of the whipping chamber illustrating the air inlet connections.

With the apparatus illustrated, the constituents of the ice cream or other product to be prepared, excepting the air or other gas that is to be incorporated therein, are fed continuously to a freezing chamber, and after the freezing operation has been carried far enough to increase the density of the mix to a predetermined point, a valve in an outlet pipe of said freezing chamber is opened, whereupon the frozen mixture is delivered to an agitating or whipping chamber. This latter chamber is supplied with a regulated quantity or volume of air, depending upon the percentage of air or gas which it is desired to incorporate in the frozen mixture during the whipping thereof in the whipping chamber. This incorporation of the air or gas in the frozen mixture, of course, reduces its density, and after the density thereof has been reduced to the desired point, a valve in a discharge pipe leading from said whipping chamber is opened, and the aerated frozen material discharged through a suitable discharge connection. In other words, the method contemplated may be said to consist in constantly feeding the constituents, other than the air or gas, of the ice cream or other product to be frozen, into a freezing chamber, freezing said mixture, and after the initial portion of said mix has been frozen to the desired density, then continuously feeding the same to a whipping chamber and there incorporating air to a predetermined extent before it is ultimately discharged in the form of a finished product.

Referring particularly to Figure 1, the mix, including all the constituents except the air or gas, is fed through a supply pipe 10 that extends to a point near the bottom of a feed tank 11, from which a discharge pipe 12 extends to the freezing chamber 13. The mix is maintained at a constant level indicated at 14 in said feed tank by means of a float control valve 15 in the supply pipe 10. The mix may be fed through the apparatus in any suitable way, but preferably the feed tank 11 is provided with an air inlet 16 through which a regulated quantity of air is admitted to maintain a proper pressure on the mix within said tank. Tank 11 may be provided with a man hole 17 for purposes of allowing inspection or for other purposes.

Freezing chamber 13 may be of any desired type, being illustrated more or less diagrammatically in the present instance, but broken away to show the beater blades 18 in the interior thereof, as well as a portion of the scrapers 19. An air cock 20 is also provided for exhausting air from the chamber 13 preparatory to operation of the apparatus. For actuating the beater blades and scrapers, gearing indicated at 21 is interposed between the same and a triple phase motor 22 to which current is supplied as will be hereinafter more fully described as another feature of the present apparatus.

Freezing chamber 13 is jacketed for the circulation of a freezing medium such as brine around the same, such medium being supplied through an inlet pipe 23 and discharged from said jacket through an outlet pipe 24.

Leading from freezing chamber 13 is a discharge pipe 25, in which there is interposed a T-section for the provision of a sampling outlet 26 that is controlled manually by a valve 27. There is also in discharge pipe 25 a valve 28 for controlling the discharge of the frozen material from freezing chamber 13. This valve 28 may be operated manually, although it is preferably automatically controlled by means responsive to the density of the materials being frozen in chamber 13.

This automatic control of valve 28 is accomplished by devices including apparatus such as disclosed in United States Letters Patent No. 1,449,458, which comprises an indicator 29, which is adapted to establish one or the other of two circuits through means of what might be termed a minimum contact member 30 and a maximum contact member 31. The construction of this mechanism is fully illustrated and described in the patent before referred to, so that in the present instance the circuit arrangements only have been diagrammatically illustrated. As illustrated two of the main feed wires 32, 33, lead directly to motor 22, while the third wire 34 leads to the indicator 29 and thence to motor 22 through wire 35. Extending from line 34 is a line 36, which, together with lines 37 and 38, from contact members 30, 31, are connected through magnetic switches 39 and 40 to a motor 41 adapted to drive a worm 42, meshing with segmental gear member 43, mounted on the valve stem of valve 28.

The magnetic switches 39 and 40 are opened and closed through their solenoids 39a and 40a, respectively, which are energized by the making of the circuits through contact members 29, 30, and 31, which are de-energized by means of limit switches 44, 45, located in lines 38, 37, respectively, said limit switches being adapted to break the circuit in their respective lines after a predetermined number of revolutions of the shaft of motor 41, depending upon the number of revolutions required to open or close valve 28. When the mix is first introduced to freezing chamber 13, the density thereof being at a minimum, the indicator contact 29 will make contact with member 30, due to the comparatively small quantity of current being consumed in the actuation of motor 22. This will establish the circuit through line 37, and the solenoid 39a therein will effect a closing of magnetic switch 39, thereby rendering motor 41 operative to close valve 28, this circuit being broken by limit switch 45 after said motor has made the predetermined number of revolutions necessary to close said valve. As the mix in chamber 13 gradually freezes, or, rather, ultimately becomes frozen to the desired extent, its density will be such as to require the consumption of an increased quantity of current by motor 22, with the result that the indicator contact member 29 will be moved into engagement with the maximum contact member 31, thereby establishing the circuit through line 38. This energizes solenoid 40a of magnet switch 40, closing the latter and causing the operation of motor 41 in a direction reverse to that in which it was originally operated.

This reverse operation of motor 41 results in an opening of valve 28, the motor remaining in operation until the circuit is broken by limit switch 44.

Valve 28 having been opened, the frozen material feeds through pipe 25 to the whipping chamber 46 illustrated more or less diagrammatically, except that the wall thereof is partially broken away to show a portion of the blades 47 and the scrapers 48. This chamber 46 has a series of air inlets 49 all communicating with an air supply pipe 50, in which there is a valve 51 that may be controlled manually, but which is preferably controlled automatically by means similar to those utilized in the automatic control of valve 28. The shaft of beater blades 47 is connected to gearing indicated at 52, adapted to be driven by a motor 53 to which current is supplied from a suitable source, this motor being of a type like motor 22. Two of the feed lines for said motor 53 are indicated 54, 55, and the third feed line 56 thereof goes through an indicator contact member 129, returning from the regulator device through a line 57. The valve stem of valve 51 carries a segmental gear 143, meshing with a worm 142 on the shaft of motor 141 and said motor is adapted to be connected to the source of current for motor 53 through movable contact member 129, as in the case of motor 41 for valve 28. The operation of motor 141, however, is exactly the reverse of that of motor 41. This is due to the fact that as the frozen mix enters whipping chamber 46, its density is greater than it is after the air has been incorporated therein.

For this reason, when contact is made through indicator member 129, with the maximum contact member 131 of this second control instrument, the circuit established through line 138 for energizing solenoid 140a for closing magnetic switch 140, motor 141 is actuated to open valve 51, thereby permitting air to be supplied to said whipping chamber. After the desired percentage of air or other gas has been incorporated or whipped into the frozen mix, so that the density of such mix has been reduced to the desired degree, indicator contact member 129 moves into engagement with a minimum contact member 130, thereby closing the circuit to motor 141 through line 137, solenoid 139a, and magnetic switch 139. The effect of the closing of this circuit is to rotate motor 141 in a reverse direction, closing valve 51 so as to prevent the further supply of air to whipping chamber 46. It will be appreciated that all that is necessary in connection with this automatic control of the extent to which the mix is frozen in chamber 13 is to take samples of the frozen mix from sampling outlet 26 and observe the position of indicator contact element 29 when it has been noted by means of such samples that the mixture has been frozen to the desired extent. The proper relative position of maximum contact member 31 can thus be determined so that valve 28 will not be opened by the devices described until the mix has been frozen to the proper extent. These observations would, of course, be made when the apparatus is first placed in operation, and proper setting of maximum contact member 31 will be made at that time.

Likewise, in the case of the automatic control of the air supply for whipping chamber 46, observation will be made as to the reduction in density of materials discharged from said chamber so that the position of movable contact member 129 could be noted at the time the mix, flowing from chamber 46, has been aerated or whipped to the proper extent. Having made these observations at the time operations were begun, minimum contact member 130 could be adjusted so as to ensure the cutting off of the air supply at the proper times.

Whipping chamber 46 is provided with an air cock 58 whereby air may be exhausted from said chamber before the apparatus is put in operation. Said chamber is also jacketed for the circulation of a refrigerating medium around the same, but as the temperature of the refrigerating medium for this chamber is usually higher than that which it is necessary to maintain in chamber 13, the freezing medium passed through the jacket of whipping chamber 46 may be supplied through pipe 59, connected to brine discharge pipe 24 of freezing chamber 13. A return pipe 60, connected to the jacket of chamber 46, is also connected to said discharge pipe 24 of freezing chamber 13, the flow of brine through pipes 59 and 60 being controlled by a valve 61 in said pipe 59 and a valve 62 in pipe 24 intermediate the points at which pipes 59 and 60 communicate with said pipe 24. With this arrangement, the proper adjustment of valve 62 will effect a by-passing of the necessary quantity of freezing medium through pipe 59 to the jacket of chamber 46 and back through pipe 60.

The temperature of the freezing medium passing through these several pipes may be observed at all times by the provision of thermometers 63 in pipes 23, 24, and 60. The mixture, after whipping, in chamber 46, is discharged therefrom through discharge pipe 64, which is provided with a goose neck terminal 65 and a control valve 66. Valve 66 is, of course, closed when operations are first begun, not being opened permanently until the mixture flowing through the apparatus has been whipped and had incorporated therein a predetermined quantity or percentage of air or other gas that is desired in the finished product. However, before valve 66 is permanently opened, it may be periodically opened and closed when observing the extent of aeration of the mixture for the purpose of determining the proper positioning of the minimum contact member 130 of the automatic control mechanism for air supply valve 51. It should also be added that a valve 67 is provided in supply pipe 12 for freezing chamber 13, in order to cut off the supply of mix to said chamber whenever desired.

As before outlined, the apparatus thus described renders possible a continuous treatment of materials of which the frozen food product is composed, this treatment consisting in first freezing all the constituents other than the gas or air in the absence of such gas or in the presence of a volume of gas less than the volume desired in the finished product until they attain the desired predetermined density, this freezing of said constituents being automatic, after which they are fed continuously to a whipping chamber, where an automatically controlled and regulated quantity of air is brought into contact therewith, so that said constituents will have incorporated therein the desired predetermined quantity of air or other gas.

It will be appreciated that so far as the method described is concerned, the apparatus may be varied considerably and while it is preferable that the discharge of the frozen mixture from the freezing chamber and the supply of air to the whipping chamber be controlled automatically, nevertheless valves 28 and 51 may be operated manually by attendants who would constantly observe the indicators of the regulating devices shown and open and close said valves if and when the indicators of said devices assume positions corresponding to the maximum and minimum densities of the materials.

What we claim is:

1. The method of manufacturing frozen food products having a gas, such as air, incorporated therein which consists in partially freezing all the constituents other than the gas in the absence of said gas to a regulated density and subsequently incorporating the gaseous content in said partially frozen mass.

2. The method of manufacturing frozen food products having a gas, such as air, therein which consists in partially freezing all the constituents other than the gas in the absence of the minimum quantity of gas desired in the finished product to a regulated density and subsequently incorporating a regulable volume of gas in said partially frozen mixture.

3. A continuous method of manufacturing frozen food products having a gaseous content, such as air, therein, which consists in continuously partially freezing all the constituents other than the gas substantially free from said gas and then bringing a regulated quantity of gas into contact with said frozen mass and incorporating a regulable volume of the same in said mass.

4. The method of manufacturing frozen food products having a gaseous content, such as air, which consists in partially freezing all the constituents in the absence of air, then supplying air to the partially frozen mass and whipping said mass to incorporate a regulable volume of the air in the same, and controlling the supply of air to said mass.

5. The method of manufacturing frozen food products having a gaseous content, such as air, which consists in partially freezing the non-gaseous constituents in the absence of air, then supplying air to the partially frozen mass and whipping said mass to incorporate a regulable volume of air in the same, the supply of air to said partially frozen mass being controlled by the density of said mass as affected by said whipping action.

6. The method of manufacturing frozen food products which consists in separately incorporating the gaseous content of the product therein in quantities controlled by the plasticity of the product and freezing such product, said steps of incorporating the gaseous content and freezing the product being performed successively and continuously.

7. In the method of manufacturing frozen food products having a gaseous content, the steps of incorporating gas in said product in quantities controlled by the plasticity of the product and freezing said product, said steps being performed separately from one another but successively and continuously.

8. The process of treating material to change its condition, including causing the material to flow over a refrigerated surface, mechanically agitating the material during such flow, thereafter adding a gas, causing the combined material and gas to flow over a second refrigerated surface, and agitating the combined material and gas during said last mentioned flow.

9. The process of treating material to change its condition, which includes causing the material to flow over a refrigerated surface, mechanically agitating the material during such flow, thereafter adding a further ingredient in predetermined relative proportion, mixing said material and added ingredient, and preventing rise in temperature during said mixing.

10. The process of treating material to cause rapid solidification of at least a portion thereof, which includes causing the material to flow over a refrigerated surface sealed from exposure to the atmosphere, and thereafter adding thereto and mixing therewith a gas.

11. The process of treating material to change its condition, which includes causing the material to flow as a continuous stream over a pair of separate refrigerated surfaces, and adding a further ingredient to the stream after passing the first surface and before passing the second.

12. The process of treating material to change its condition including causing the material to flow over a refrigerated surface, mechanically agitating the material during such flow, thereafter adding a second material, causing the combined material to flow over a second refrigerated surface, and agitating the material during said last-mentioned flow.

13. The method of manufacturing frozen food products having a gaseous content such as air to obtain a predetermined percentage of gas in relation to the other constituents, which consists in bringing together said constituents containing less than said predetermined percentage of gas with a regulated quantity of gas as related to the other constituents, whipping said mixture of gas and other constituents to incorporate all of the available gas with the other constituents, maintaining the material, including the gas, under the same pressure during the whipping operation, said pressure being greater than atmospheric.

CHESTER EARL GRAY.
GROVER D. TURNBOW.